READ-ONLY MEMORY WITH AN ADJACENT APERTURED MAGNETIC PLATE

Filed Aug. 12, 1966 2 Sheets-Sheet 1

INVENTOR
CALVIN RANSOM

BY [signature]

ATTORNEY

Jan. 13, 1970 C. RANSOM 3,490,011

READ-ONLY MEMORY WITH AN ADJACENT APERTURED MAGNETIC PLATE

Filed Aug. 12, 1966 2 Sheets-Sheet 2

United States Patent Office 3,490,011
Patented Jan. 13, 1970

3,490,011
READ-ONLY MEMORY WITH AN ADJACENT APERTURED MAGNETIC PLATE

Calvin Ranson, Bozeman, Mont., assignor to Texas Instruments Incorporated, a corporation of Delaware Filed Aug. 12, 1966, Ser. No. 572,028
Int. Cl. G11b *5/00*
U.S. Cl. 340—174 12 Claims

ABSTRACT OF THE DISCLOSURE

Disclosed are magnetic storage devices of the type utilizing thin film memories and having non-destructive read-out, yet such devices permit relatively easy storage and change of permanent information. These novel storage devices include a magnetic layer positioned over a ferromagnetic film memory system that is composed of an orthogonal arrangement of insulated sense and word conductors adjacent a ferromagnetic thin film deposited upon a suitable substrate to form a plurality of bit locations, and a plurality of holes at specified locations in the magnetic layer coinciding with particular bit locations for storing binary information.

This invention relates to magnetic storage devices and more particularly to a thin magnetic film memory capable of non-destructive rear-out interrogation.

Thin magnetic films have received increasing attention in the past few years as prospective computer components. The decrease in the total magnetizing energy required with decreasing volume, and corresponding reduction of eddy current losses as well as higher switching speeds attainable in comparison to bulk magnetic devices such as cores are the primary factors which have lead to the investigation of thin magnetic film. These thin magnetic films are layers of magnetic material deposited upon a substrate, such films generally having a thickness from 1000 A to 2000 A. The fact that cost reducing mass production techniques can be employed in the preparation of thin magnetic film circuits is another important advantage over the use of conventional magnetic units.

Thin magnetic film may be produced in different ways, for example by evaporation in a vacuum, by cathode sputtering in a gaseous atmosphere, and by electroplating. These films are produced so as to exhibit uniaxial magnetic anisotropy. The term uniaxial magnetic anisotropy is understood to mean that tendency of the magnetization throughout the film to align in one preferred distinct direction. This preferred direction is termed the "easy" direction and that direction perpendicular to the "easy" direction is termed the "hard" direction. The uniaxial anisotropy is generated, for example, by the evaporation of a ferromagnetic material onto a heated substrate with the presence of a static magnetic field parallel to the plane of the substrate.

During this process, the mangetic field induces the "easy" direction of magnetization. The results of such a fabrication is that the film, without any external field, behaves similarly to a single domain, i.e., all of the magnetization points in the same direction. Where, as discussed above, a film is said to exhibit uniaxial anisotropic characteristics, such a medium then exhibits a single axis of preferred alignment, along with a particular phenomena of opposite remanent orientation states for magnetic flux. It is this characteristic of thin film elements made of magnetic material which is utilized to store binary information, in that, the opposite oriented stable remanent directions of flux are utilized to designate the different binary values, "0" and "1."

By way of illustration, a simple thin film magnetic memory is composed of a deposited magnetic film on a supporting substrate. Conductive word and sense lines are laid adjacent to and insulated from the substrate and from each other in an orthogonal arrangement. Each intersection of a sense and word line becomes a bit location of information or information source.

To store information in each bit location of the thin film magentic memory, a common method is to produce a current $I_w$ in each word line conductor. Since the word line conductors are aligned with the anisotropy direction of the underlying magnetic film, a magnetic field, $H_w$, will be formed that is perpendicular to the anisotropy field $H_k$. The resultant magnetic field will force the magnetization of each bit location to lie in a direction perpendicular to the anisotropy axis $H_k$. A current pulse $I_s$ is introduced in each sense line conductor that lags the word line pulse $I_w$ in time. The polarity of the sense line current pulse $I_s$ produces a magnetic field, $H_s$, aligned with the anisotropy magnetic field $H_k$ but in either direction along the anisotropy axis as determined by the polarity of the sense line current pulse $I_s$. The resultant magnetic field will force the magnetization vector of each bit location to be either less or greater than 90° to the anisotropy direction. Upon removal of both the current pulses $I_w$ and $I_s$, the magnetization vector at each bit location will align itself with the anisotropy direction but oriented in one of the two remanent directions, thus storing the required binary information.

The conventional mode of reading these magnetic film storage elements is the so called two dimensional orthogonal (DRO) mode. Using this mode, stored information is sensed by applying an external magnetic field whose magnetic vector is directed at an angle of 90° to the direction of the anisotropy axis of the magnetic film element. Such an external magnetic field larger than the anisotropy field of the element causes the magnetization of the element to rotate to the "hard" direction in an attempt to align itself with the externally produced magnetic field. The rotation of the magnetization causes a change in flux near the sense conductor which induces a voltage pulse therein according to Faraday's law of electromagnetic induction. The polarity of the voltage pulse is then determined by the direction of the change in flux. Therefore, the polarity of the voltage pulse allows sensing the remanent direction of the magnetization of the magnetic film element, thus reading the stored binary information.

Whenever the magnetization rotates 90° from its stored information position by an externally produced magnetic field, there is an equal probability that the magnetization will return to either position along the anisotropy axis after the removal of the external "hard" direction magnetic field. Thus, for all practical purposes, the stored information is destroyed. This method of sensing is thus called destructive readout (DRO).

A nondestructive read-out technique (NDRO) would, of course, be desirable. Such a system would enable one to sense the direction of the magnetization of the magnetic field element without destroying the stored information. A number of NDRO systems and techniques have been proposed. However, they all require unconventional film element construction or separate circuitry for sensing and restoring information in the magnetic film elements.

A common nondestructive read-out system utilizing quite complex external circuitry is one similar to that used in the write method previously described. A technique is utilized whereby after each bit of information is read, the polarity of the magnetic vector of each read bit is determined and the appropriate polarity sense line current pulse $I_s$ is introduced to allow the stored information to return to its original state.

It should be obvious that present non-destructive readout systems are involved and complex requiring an array of external sensing and rewrite circuitry.

It is therefore an object of this invention to provide a system for mechanical information storage utilizing a magnetic keeper and electrical non-destructive retrieval of information in magnetic thin film memory systems.

It is another object of this invention to provide a system for nondestructive readout of magnetic film memory systems without the need for external rewrite circuitry.

It is a further object of this invention to provide a non-destructive readout system whereby stored information in thin film magnet memories can be changed by simply replacing a magnetic keeper with another magnetic keeper containing new information.

In accordance with this and other objects, features, and improvements to be described subsequently the invention involves an improved non-destructive read-only memory element (RIME) that allows for reatively easy storage and change of permanent information. Accordingly, in a preferred embodiment of this invention, a magnetic layer (keeper) is placed over a ferromagnetic film memory system composed of an orthogonal arrangement of insulated sense and word conductors adjacent a ferromagnetic thin deposited upon a suitable substrate, for example aluminum.

Information is stored by placing the magnetic keeper (a layer of magnetic material that has been magnetized such that its magnetization direction is known) adjacent the ferromagnetic element. The magnetization direction of the keeper is aligned with the anisotropy axis of the film memory. The keeper has holes at specified locations to coincide with particcular bit locations. The arrangement of holes or no holes determines in which of two directions along the anisotropy axis the magnetization vector lies, thereby storing the required binary information.

Each bit location is read by the standard method of introducing a word line current pulse $I_W$ which causes the magnetization vector to rotate in an attempt to align itself with the externally applied field. The rotating magnetic flux induces a voltage in the sense conductor, the polarity of which is determined by the original remanent direction of the magnetization. As described perviously once the word current is removed, the demagnetizing field of the keeper forces the magnetization to return to a predetermined "easy" axis alignment. The hole or no hole arrangement dictates in what direction along the "easy" axis the magnetization at each bit location will lie. Thus, after readout, the magnetization of each bit location returns to its original state.

To change the stored information, all that is required is the removal of the magnetic keeper, a simple operation, and insertion of a new keeper with preformed holes corresponding to the new desired information and a complete read cycle at the memory. The above assumes that the retrieval of the stored information is accomplished by observing the signals produced during the rise time of the read pulse. If the sensed signals are to correspond to the read pulse fall time then it is not necessary to cycle the memory prior to reading after insertion of a new keeper-program. In addition to the advantage of ease of changing the stored information, the keepers with their stored information can be retained for later use, a procedure that would be much more complicated in an electrical write system.

The novel features believed to be characteristic of this invention are set forth with particularity in the appended claims. The invention itself, however, as well as further objects and advantages thereof, may best be understood by reference to the following detailed description of illustrative embodiments, when read in conjunction with the accompanying drawings; wherein:

Figure 1:
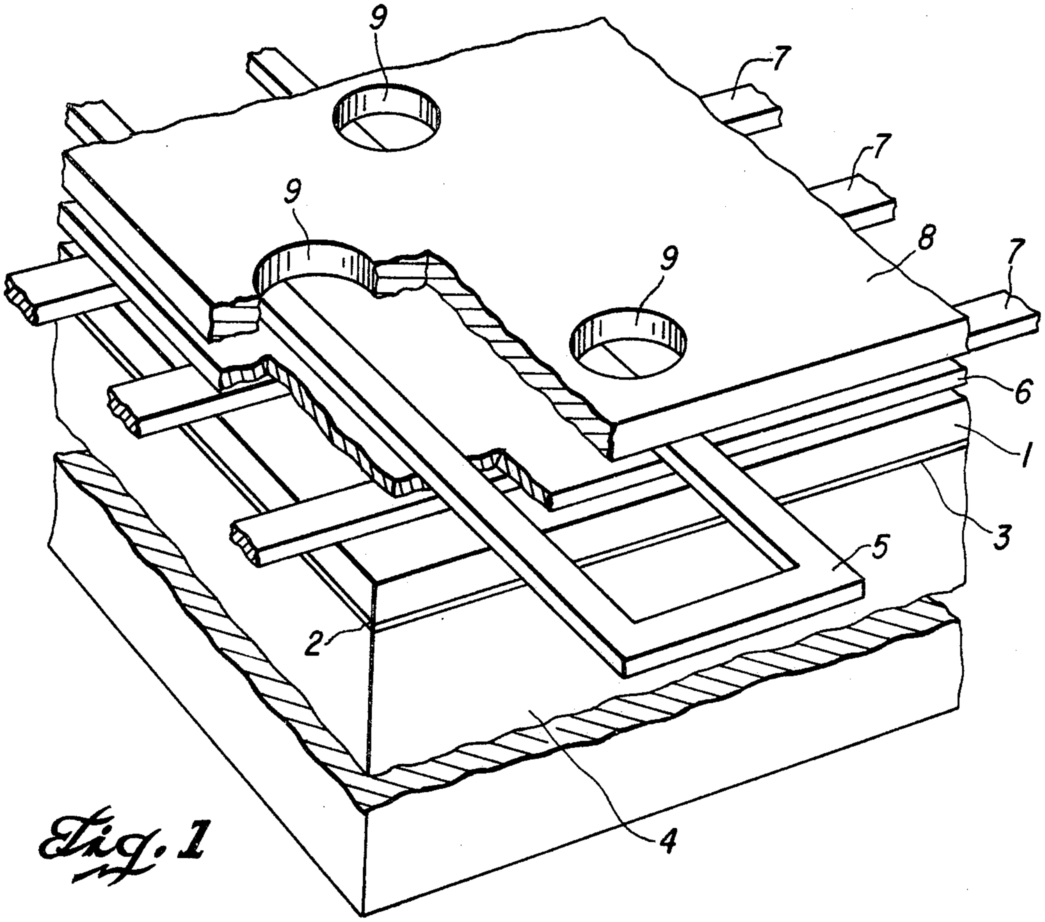
FIGURE 1 is a fragmentary perspective view of a portion of the non-destructive readout thin film memory system.

Referring now to FIGURE 1, an illustrative embodiment of the thin film memory system of the invention is constructed by placing a tape 1, approximately .0015″ in thickness, of an electrically insulating material, for example, Mylar, a transparent, water-repellent film of polyethylene terephthalate resin available from E.I. du Pont de Nemours and Company, adjacent a magnetic thin film 2. It is understood of course that the specific dimensions and materials given here are merely by way of example. The magnetic thin film 2 is formed by depositing a continuous thin film of magnetic material upon one surface 3 of an aluminum plate 4 having the approximate dimension of 3″ x 3.125″ x .046″. The thin magnetic film 2 may be composed of Permalloy, a nickel-iron alloy containing approximately 70% nickel, 19% iron, and 2% cobalt and will be of the order of 1000 A. to 2000 A. in thickness. The thin magnetic fim 2 is deposited by using conventional evaporation techniques within a magnetic field. The magnetic field induces the uniaxial anisotropy of the magnetic film which is necessary to store binary information.

The capability of the magnetic film 2 depends upon the existance of the uniaxial anisotropy in the plane of the film, meaning that the magnetization lies in the plane of the film, and parallel to a given axis, usually known as the "easy" axis. The magnetization vector can exist in only two stable positions, one being arbitrarily designated the zero direction and the other designated the one direction, thus providing a binary memory. Although, in the preferred emodiment of this invention a continuous magnetic thin film is evaporated upon an aluminum substrate, the magnetic thin film can also be discontinuous, i.e. formed as discrete areas, and can be formed on any suitable non-magnetic substrate, for an example, glass or ceramic, without departing from the spirit of this invention.

Parallel word conductors 7 are positioned adjacent the Mylar insulating film 1 in alignment as closely as possible to the uniaxial anisotropy axis of the magnetic thin film. A convenient method of forming the word conductors 7 and the Mylar insulating tape 1 is by chemical etching copper conductors from commercially available .0005″ copper sheet bonded to .0015″ Mylar backing. The copper is etched to form conductors, .010″ in width, on .040″ centers. Parallel sense conductors 5 are aligned perpendicularly to the word conductors 7 but are separated by a Mylar tape 6, .0005″ in thickness, thus forming a grid arrangement of word and sense conductors. Each intersection of a word and sense conductor forms a bit location of information. In a continuous magnetic film the area adjacent each intersection acts as a independent magnetic domain thereby acting similarly to a discontinuous magnetic thin film area adjacent each intersection. The sense conductors are preferably of copper and are .010″ in width. Centerline spacing of the complementary pairs of sense conductors is .040″. The copper sense conductor 5 and the Mylar insulating tape 6 can be formed as previously described.

The non-conductive magnetic keeper 8 with its prepunched holes 9 is positioned adjacent the sense conductors 5 with its magnetization direction in alignment with the anisotropy axis of the magnetic thin film 2. The "soft" magnetic keeper 8 is prepared by incorporating in an epoxy binder, powdered ferrite material with a high Q, such as sold under the trade name $Q_1$, manufactured by Indiana General Ceramics Company, in the amount of 80% by weight. The percentage of ferrite material should be kept above 70% by weight. The magnetic keeper 8 is magnetized such that it will act like a sheet magnet. Holes 9, .035" in diameter, are punched in the .030" thick keeper 8 in positions to coincide with certain designated word-sense conductor intersections. Although it is not indicated in FIGURE 1, all of the elements shown except the magnetic keeper 8 are integrally attached to each other. The magnetic keeper 8 is held in place by pressure contact only to allow simple removal and insertion of a different magnetic keeper with a new hold arrangement representing different information. The external electronic circuitry necessary to read the memory system is not illustrated.

Figure 2:
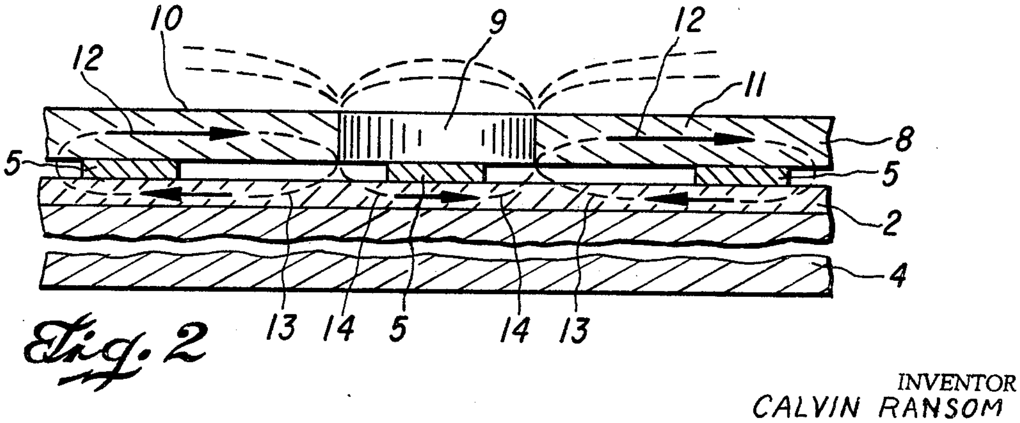
FIGURE 2 is a schematic representation in section of a portion of the non-destructive readout memory shown in FIGURE 1 with parts omitted, illustrating the direction of the lines of magnetic flux caused by a hole and no hole arrangement in the magnetic keeper.

FIGURE 2 illustrates the effect that a hole 9 or the no hole regions 10 and 11 in the magnetic keeper 8 adjacent a word-sense conductor intersection will have on the direction of the magnetic field along the anisotropy axis of the magnetic thin film 2, thereby determining the binary state of each bit location. For clarity of illustration, the relative thickness of the deposited thin film 2 has been exaggerated and the Mylar tapes 1 and 6 and the word conductors 5 as shown in FIGURE 1 have been omitted. It is to be noted that the usage of the words "hole" and "no hole" refer to locations in the keeper where there is either the presence of magnetic material or the presence of non-magnetic material. In the preferred embodiment of this invention the non-magnetic material is air, and the dimensions of the aperture containing the air is formed by drilling a hole in the magnetic keeper 8. The keeper could be as easily formed by other methods such as using non-magnetic epoxy material in the locations where the demagnetizing fields are desired and still remain within the purview of this invention. The direction of the magnetic keeper's magnetic field is indicated by the arrows 12. The demagnetizing field of the keeper caused by the hole 9 penetrates the magnetic thin film layer 2. Due to this demagnetizing field, the magnetic flux lines 14 of the magnetic thin film 2 adjacent the hole 9 will run in the opposite direction from the magnetic flux lines 13 in the regions close to the hole 9. Thus by a system of holes and no holes adjacent the word-sense conductor intersections, binary information can be stored in the magnetic thin film 2.

Figure 3:
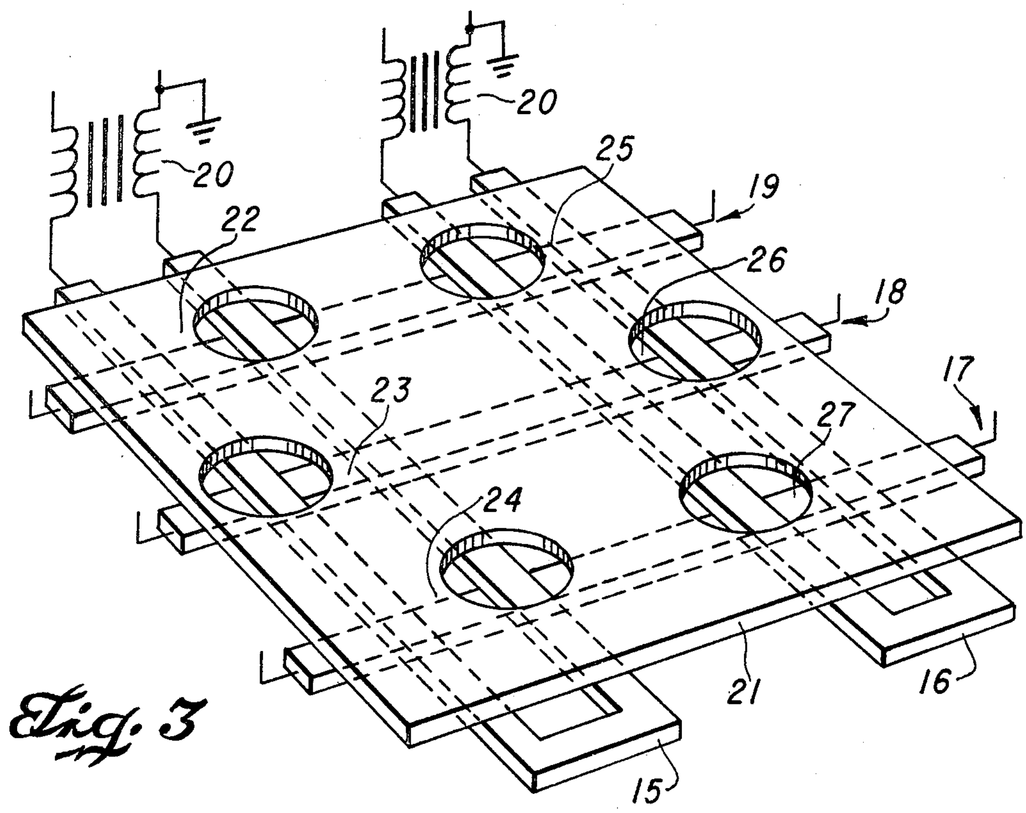
FIGURE 3 is a pictorial view of the word and sense conductors' orthogonal arrangement with parts omitted, illustrating a selected hole and no hole arrangement of the magnetic keeper.

An example of a hole-no hole arrangement is shown in FIGURE 3. For the sake of simplicity, only the magnetic keeper 21, sense conductors 15 and 16 and the word conductors 17, 18 and 19, are illustrated. In a program having a long solid stretch of keeper material, the demagnetizing field becomes small when only single sense conductors are used. This problem is overcome when the sense conductors are doubled back to form complementary pairs of sense conductors. The worse case along a word line is two adjacent holes or no holes and along the sense line a row of adjacent holes and no holes. Both situations are handled by the complementary pair approach for there will always be a magnetic interface at each double intersection thereby insuring large demagnetization fields in the region of each bit location due to always having a hole adjacent the intersection of the word conductor and one leg of the sense conductor complementary pair. Either the single or double sense conductor intersection technique is compatible with this invention although the single sense conductor approach is more limited as explained. Sense lines 15 and 16 are placed at 90° angles to word lines 17, 18 and 19. Each sense line pair is connected to a balanced-unbalanced transformer 20 and a sense amplifier circuit (not shown) and each word line is connected to a word line driver circuit (not shown). When a read current pulse is introduced in the word conductors a sense voltage pulse is induced in each sense conductor which is caused by the lines of magnetic flux of the rotating magnetic vector "cutting" the sense conductor. The polarity of each sense current pulse is determined by the hole or no hole arrangement at a bit location. Giving the sense pulse of the polarity produced at the intersection 22 of the word conductor 19 and sense conductor 15 an arbitrary designation of "0," the information stored in the intersection 24 of the word and sense conductors 17 and 15, respectively, and the intersection 26 of the word and sense conductors 18 and 16, respectively, will also be "0." The information stored in the intersection 23 of the word and sense conductors 18 and 15, respectively, the intersection 25 of the word and sense conductors 19 and 16, respectively, and the intersection 27 of the word and sense conductors 17 and 16, respectively, will be "1."

When the read current is removed from the keeper's demagnetizing field will force the magnetization to return to the direction along the anisotropy axis determined by the hole-no hole arrangement of the magnetic keeper 21. Therefore the keeper method provides a permanent information storage method. The stored information is changed simply by removing the magnetic keeper 21 and replacing with one having new information.

Figure 4:
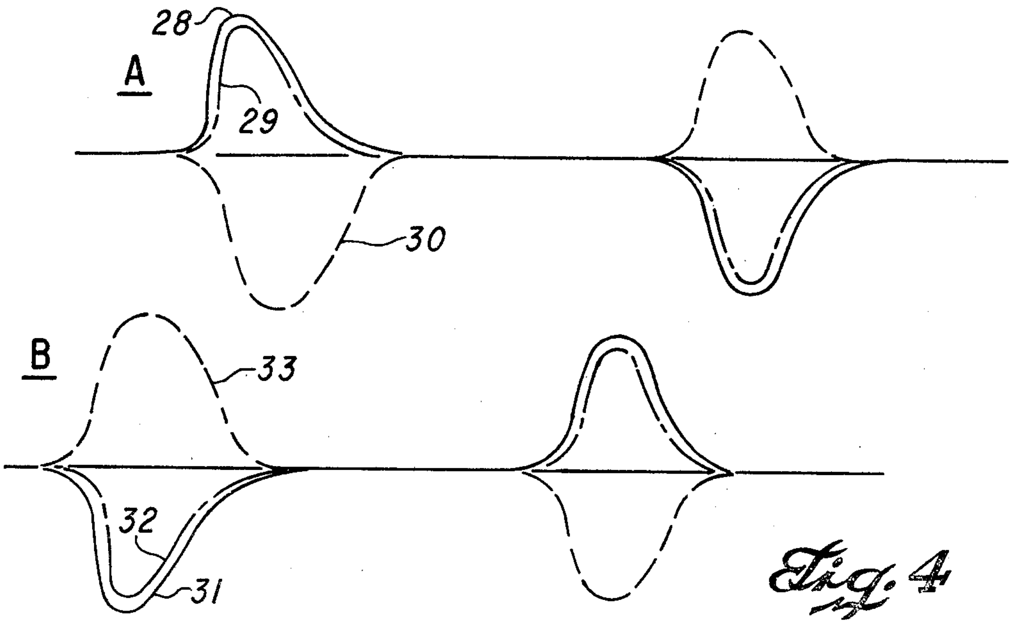
FIGURE 4 is a graphic representation of the voltage wave forms induced when the magnetic memory is subjected to a read current pulse in the word line conductors.

FIGURE 4 illustrates graphically the resulting sense conductor voltage wave forms induced in the sense conductors 15 and 16 in FIGURE 3 by word conductor currents of 500 milliamperes with rise and fall times of approximately 12 nanoseconds produced in the word conductors 17, 18 and 19. The group of curves designated as (A) show the information stored in each bit location (complementary pair sense conductor intersection of a particular word conductor) along the sense conductor 15 as shown in FIGURE 3. The curve 28 is the information stored in the bit location 22, curve 29 is the information stored in the bit location 24 and curve 30 is the information stored in the bit location 23. The group of curves designated as (B) show the information stored in each bit location along the sense conductor 16 as shown in FIGURE 3. The curve 31 is the information stored in the bit location 25, curve 32 is the information stored in the bit location 27 and the curve 33 is the information stored in the bit location 26. The second portions of the curves, which are simply reciprocals of the first portions of the curves, are caused by the collapse of the flux lines due to the removal of the word current pulses. By designating the polarity of the pulses as one or the other of the two binary states, i.e.: positive voltage pulse designated as "0" and the negative voltage pulse as "1," the stored binary information at each bit location can be read as either a "0" or a "1."

While the invention has been described with reference to specific methods and embodiments, it is to be understood that this description is not to be construed in a limiting sense. Various modifications of the disclosed embodiments, as well as other embodiments of the invention, may become apparent to persons skilled in the art without departing from the spirit and scope of the invention.

What is claimed is:

1. A magnetic storage device of the type capable of nondestructive read-out interrogation, comprising in combination:

(a) a support substrate;

(b) a magnetic thin film secured to one surface of said substrate, said thin film having a magnetic anisotropy axis wherein the magnetization throughout said thin film is substantially aligned in one direction;

(c) a plurality of nonintersecting word conductors adjacent to but electrically isolated from said thin film, said word conductors being aligned along said one direction;

(d) a plurality of nonintersecting, sense conductors adjacent to but electrically isolated from said word conductors, said sense conductors having two substantially parallel legs and being aligned transverse to said one direction;

(e) a selectively releasable nonconductive keeper having spaced zones of nonmagnetic material positioned within said keeper, with the remaining portions of said keeper being magnetic material, and with said zones being selectively located to overlie the intersection of one of said word conductors and one of said legs of one of said sense conductors; wherein (f) said keeper is magnetized in a direction substantially aligned with said one direction, and wherein (g) the external magnetic field under the magnetic portions of said keeper is substantially opposite to said one direction, and the external magnetic field under the nonmagnetic portion of said keeper is substantially parallel to said one direction; and wherein (h) when a word current pulse is selectively applied to said word conductors, a magnetizing field is produced which rotates the magnetic field of the portion of said thin film below said selected word conductor; and wherein (i) said rotating magnetic field induces a voltage pulse in each sense conductor overlying said selected word conductor, each of said voltage pulses have a polarity relative to the binary information stored in said thin film below the intersection of said selected word conductor and each sense conductor; whereby (j) the location of said spaced zones establishes the polarity of said induced voltage pulses, and retains the stored binary information after said word current pulse is removed.

2. The memory element as defined in claim 1 wherein said nonmagnetic material is air, the dimensions of the aperture containing said air being formed by holes drilled in said magnetic keeper.

3. The memory element as defined in claim 1 wherein said thin film is a continuous thin film of FeNiCo composition and said substrate is aluminum.

4. The memory element as defined in claim 1 wherein said thin film is discontinuous and said substrate is glass.

5. The memory element as defined in claim 1 wherein said keeper is composed of powdered ferrite in an epoxy binder.

6. The memory element as defined in claim 1 wherein said keeper is composed of from 70% to 100% ferrite material by weight and wherein said ferrite is of high frequency ferrite material.

7. A nondestructive read-only memory element comprising:

(a) a ferromagnetic thin film deposited adjacent one surface of a substrate, said thin film exhibiting uniaxial anisotropy, (b) a plurality of word conductors aligned along said anisotropy axis and adjacent the surface of said thin film, said word conductors capable of producing a magnetizing field upon introducing a word current pulse thereto which rotates the direction of magnetization of said thin film adjacent said word conductors, (c) a plurality of sense conductor complementary pairs aligned orthogonally to and adjacent said word conductors such that the lines of flux produced by said word current pulse induce in each said sense conductor pair a corresponding voltage pulse that will relate in polarity to the stored binary information, and (d) a replaceable magnetic keeper containing nonmagnetic material in selected locations to coincide with the intersection of each said word conductor and one of the two legs of the said sense conductor complementary pair; wherein (e) the external magnetic field under the magnetic material of said keeper is substantially opposite to the internal magnetization of said keeper, and the external magnetic field under the nonmagnetic material of said keeper is substantially parallel to said internal magnetization; whereby (f) said keeper determines the polarity of said sense voltage pulse and retains said stored binary information after removal of said word current pulse.

8. The memory element as defined in claim 7 wherein said nonmagnetic material is air, the dimensions of the aperture containing said air being formed by holes drilled in said magnetic keeper.

9. The memory element as defined in claim 7 wherein said thin film is a continuous thin film of FeNiCo composition and said substrate is aluminum.

10. The memory element as defined in claim 7 wherein said thin film is discontinuous and said substrate is glass.

11. The memory element as defined in claim 7 wherein said keeper is composed of powdered ferrite in an epoxy binder.

12. The memory element as defined in claim 7 wherein said keeper is composed of from 70% to 100% ferrite material by weight and wherein said ferrite is of high frequency ferrite material.

References Cited

UNITED STATES PATENTS

| | | | |
|---|---|---|---|
| 3,432,822 | 3/1969 | Bertelsen | 340—174 |
| 3,160,576 | 12/1964 | Eckert | 204—192 |
| 3,195,115 | 7/1965 | Bradley | 340—174 |
| 3,196,416 | 7/1965 | Williams | 340—174 |

BERNARD KONICK, Primary Examiner

K. E. KROSIN, Assistant Examiner